(12) United States Patent
Kahl et al.

(10) Patent No.: US 8,470,110 B2
(45) Date of Patent: Jun. 25, 2013

(54) SAMPLE CHAMBER AND METHOD FOR THE PRODUCTION THEREOF

(75) Inventors: Johan-Valentin Kahl, Munich (DE); Roman Zantl, Baldham (DE)

(73) Assignee: ibidi GmbH, Martinsried (DE)

( * ) Notice: Subject to any disclaimer, the term of this patent is extended or adjusted under 35 U.S.C. 154(b) by 834 days.

(21) Appl. No.: 11/996,546

(22) PCT Filed: Jul. 31, 2006

(86) PCT No.: PCT/EP2006/007568
§ 371 (c)(1),
(2), (4) Date: Dec. 29, 2009

(87) PCT Pub. No.: WO2007/014739
PCT Pub. Date: Feb. 8, 2007

(65) Prior Publication Data
US 2010/0175488 A1    Jul. 15, 2010

(30) Foreign Application Priority Data

Aug. 1, 2005  (EP) ..................................... 05016687

(51) Int. Cl.
*B01L 3/00* (2006.01)
*B29D 23/00* (2006.01)
*B29L 23/00* (2006.01)

(52) U.S. Cl.
USPC .......... 156/69; 73/864.91; 422/503; 422/547; 422/552

(58) Field of Classification Search
USPC ..... 73/863.23, 864.91; 156/69; 422/502–503, 422/547, 551–553, 559, 569, 939, 942, 946, 422/948, FOR. 110; 427/569
See application file for complete search history.

(56) References Cited

U.S. PATENT DOCUMENTS 4,722,598 A * 2/1988 Ford .............................. 359/398
4,756,884 A    7/1988 Hillman et al.
(Continued)

FOREIGN PATENT DOCUMENTS

DE   10148210 A1   4/2003
EP    0290125 A2  11/1988
(Continued)

OTHER PUBLICATIONS

Erik H. Weber, Development and Modeling of Thermally Conductive Polymer/Carbon Composites, A Dissertation Submitted to the Graduate Faculty of the Michigan Technological University in partial fulfillment of the requirements for the degree of Doctor of Philosophy in Chemical Engineering Houghton, Michigan, Dec. 2001, © 2001, pp. i-xv and 1-278.*

*Primary Examiner* — Thomas P Noland
(74) *Attorney, Agent, or Firm* — IP Strategies

(57) ABSTRACT

The invention relates to a sample chamber with a cover plate and a bottom plate which is joined thereto in a fixed manner, wherein a recess is provided in the cover plate so that a reservoir is formed by the bottom plate, wherein a planar element with holes is provided in the reservoir, wherein the holes have a predetermined arrangement and/or size.

24 Claims, 2 Drawing Sheets

U.S. PATENT DOCUMENTS

| | | | |
|---|---|---|---|
| 5,124,126 A * | 6/1992 | Ripp | 422/26 |
| 5,597,456 A | 1/1997 | Maruyama et al. | |
| 6,083,355 A | 7/2000 | Spence | |
| 6,309,608 B1 * | 10/2001 | Zhou et al. | 506/40 |
| 7,517,499 B2 | 4/2009 | Kahl | |
| 7,582,264 B2 | 9/2009 | Kahl et al. | |
| 2002/0146557 A1 | 10/2002 | Claude et al. | |
| 2002/0187074 A1 | 12/2002 | O'Connor et al. | |
| 2003/0030184 A1 | 2/2003 | Kim et al. | |
| 2005/0164373 A1 | 7/2005 | Oldham et al. | |
| 2007/0015137 A1 * | 1/2007 | Zantl | 435/4 |
| 2010/0081189 A1 * | 4/2010 | Zantl et al. | 435/287.1 |

FOREIGN PATENT DOCUMENTS

| | | | |
|---|---|---|---|
| EP | 1319495 A1 | 6/2003 | |
| EP | 2261718 A2 * | 12/2010 | |
| WO | 8911500 A | 11/1989 | |
| WO | WO 9426413 A1 * | 11/1994 | 73/864.91 |
| WO | 2005079985 A1 | 9/2005 | |
| WO | WO 2007/014739 * | 2/2007 | |

* cited by examiner

SAMPLE CHAMBER AND METHOD FOR THE PRODUCTION THEREOF

FIELD OF THE INVENTION

The invention relates to a sample chamber with a cover plate and a bottom plate which is joined thereto in a fixed manner, wherein a recess is provided in the cover plate in order to form an at least partially enclosed reservoir with the bottom plate.

BACKGROUND OF THE INVENTION

A sample chamber of this nature is for example known from DE 101 48 210. The known sample chamber has microfluidic structures, such as micro-fluid channels or reservoirs. With the sample chamber known from DE 101 48 210 a groove is provided in a plastic plate which is covered by a film so that a microchannel is formed. On the surface of the plastic plate opposite the groove two circular reservoirs are arranged which have a fluid connection to the channel.

The known sample chambers are in particular used for the microscopy of molecules (e.g. DNA) or cells. The substances to be examined are put into a reservoir of the sample chamber along with a liquid and can then be examined with high resolution methods (for example, transmitted light microscopy, fluorescence microscopy, confocal microscopy, etc.).

The sample chambers known from the state of the art have however the disadvantage that introduced non-adherent molecules or cells can only be observed and examined with difficulty, because they are flushed away with the interchange of liquid in the microfluidic structure. For example, certain bacteria do not adhere to glass surfaces.

BRIEF SUMMARY OF THE INVENTION

It is therefore the object of the present invention to provide a sample chamber in which also non-adherent molecules or cells can be examined in a simple manner.

This object is solved by the sample chamber below.

The sample chamber according to the invention comprises a cover plate and a bottom plate which is joined thereto in a fixed manner, wherein a recess is provided in the cover plate so that a reservoir is formed by the bottom plate, wherein a planar element with holes is provided in the reservoir, wherein the holes have a predetermined arrangement and/or size.

Molecules or cells to be examined can be held in the holes of the planar element and precisely localised due to a predetermined arrangement. Thus for example, suspension cultures can be held in sample chambers of this nature. Also during an interchange of liquids, introduced molecules or cells remain in the hole structures.

The planar element can in particular be flexible. It can be a fabric, in particular a mesh or a film. Materials of this nature facilitate simple handling, in particular during the manufacture of an appropriate sample chamber. The planar element can also comprise an electron microscope grid, which for example comprises gold or copper and can be optionally coated with carbon. The fabric can in particular be an open-meshed mono-filament fabric, such as for example the precision fabric from the Swiss manufacturer Sefar. The material can comprise polyamide (PA), polyester (PET), polypropylene (PP), ethylene tetrafluoroethylene copolymer (ETFE) or polyether ether ketone (PEEK) or consist thereof.

The planar element can be arranged in the reservoir parallel to the bottom plate. This facilitates a particularly advantageous observation through the bottom plate.

The planar element can be clamped between the bottom plate and the cover plate. This means that the planar element can have a larger area than the corresponding cross-sectional area of the reservoir (for example, the reservoir base area). During the manufacture of the sample chamber the planar element is arranged between the bottom plate and the cover plate such that it is clamped between the bottom plate and the cover plate once the two have been brought together and joined. Thus the sample chamber can be manufactured in a simple and reliable manner with the planar element being arranged in the reservoir in a stable and fixed manner.

The holes in the planar element can have diameters of 2-500 µm, preferably 10-200 µm, the planar element can have a thickness of 3-500 µm, preferably 40-300 µm and/or a distance to the bottom plate of 0-100 µm, preferably 0-10 µm. The weight per unit area of the planar element can be between 10 and 700 g/m$^2$, preferably 10-100 g/m$^2$. The open area, i.e. the total area of the holes in the surface referred to the total area of the planar element can be between 15-60%, preferably between 20 and 50%. With an open-meshed fabric or mesh the aperture size can be between 10 and 500 µm, preferably 10-100 µm and the yarn diameter between 3-500 µm, preferably between 10 and 100 µm.

Through a suitable choice of these parameters the planar element can be precisely adapted to the substances to be examined. With hole diameters in the order of magnitude of the diameter of the cells to be examined for example, one cell can be held in each of the holes. With the use of larger hole diameters the cells can grow in their native three-dimensional structure.

In particular the diameter of the holes and/or of the distance to the bottom plate can be constant. Furthermore, the holes can be arranged regularly, in particular on a grid, i.e. in the form of a grid.

The planar element can have a predetermined colour, a predetermined intrinsic fluorescence, in particular lower or equal to the intrinsic fluorescence of COC or COP or of a conventional cover slip (for example pure white glass of hydrolytic class 1, such as Menzel cover slips, in particular with the thickness no. 1.5), and/or a predetermined refractive index, in particular higher than 1.2 and/or lower than 1.7.

Thus, the parameters can be suitably matched depending on the type of examination desired. For example, for transmitted light microscopy a high contrast material, in particular with a dark colour, can be used. With fluorescence microscopic examinations, depending on the application, materials with a high or a low intrinsic fluorescence can be used. The planar element can even be used as a light guide through the appropriate choice of the refractive index.

The planar element can at least partially comprise a material which dissolves in a solvent. The planar element can comprise a material other than that of the bottom plate and/or cover plate or the material of the bottom plate and/or cover plate. In particular the planar element can comprise a material which is soluble in a first solvent and the bottom plate and/or the cover plate can comprise a material which is soluble in a different solvent. In this way the bottom plate in the reservoir in a sample chamber can first be solubilised with a solvent; the planar element can be arranged such that it leaves an impression in the solubilised surface. Then the planar material can be dissolved with a different solvent which does not attack the surface of the bottom plate so that the impression of the planar element remains.

Due to the bottom plate which is firmly joined to the cover plate, the recess on one side of the cover plate is covered so that a reservoir is formed. If the recess has no base, i.e. if it is formed as a hole, a reservoir is formed which is open on one side. If the bottom plate covers the underside, forming the bottom of the reservoir, then the reservoir is open at the top.

The recess in the cover plate can have a base so that a cavity is formed by the bottom plate. Due to a cavity of this nature in the cover plate and thus in the sample chamber, examinations can be carried out screened from the environment.

The recess in the cover plate can have an elongated shape. The recess can, for example, comprise a groove in the cover plate. In this case the sample chamber is formed in the shape of a flow chamber.

The cover plate and/or the bottom plate can be formed such that the sample chamber comprises a channel opening into the reservoir from the outside. In particular a through hole which opens into the reservoir can be formed in the cover plate and/or the bottom plate. In the cover plate a groove for forming the channel can be provided. In particular two or more channels opening into the reservoir can be provided.

A channel of this nature acts as the feed or outlet for the reservoir which can be filled in this way with liquids and/or other substances.

The surface of the cover plate opposite the recess can have a planar region and a prominence wherein a recess is formed in the prominence which is connected to the reservoir through a channel. The recess can similarly act as a reservoir and/or be formed for the accommodation of a feed device, such as a pipette. Furthermore, a one or two-dimensional array of prominences (for example a total of 96 prominences) can be provided, wherein a recess is formed in each prominence.

The bottom plate can have a thickness of 50-250 μm, preferably 100-200 μm. A bottom plate of this nature facilitates in an advantageous way the use of inverse microscopy.

The cover plate, bottom plate and/or the planar element can comprise a plastic, in particular without double refraction and/or with an intrinsic fluorescence which is essentially equal to the intrinsic fluorescence of a conventional cover slip. An optically high quality plastic of this nature improves microscopic examinations, in particular with the use of fluorescence microscopy. The bottom plate can in particular comprise a flexible material, for example a film.

The bottom plate, cover plate and/or planar element can be joined using adhesive, solvent, UV treatment, radioactive treatment, laser treatment or thermal welding. The thermal welding can take place in a planar manner or in strips, in particular only along the edge of the bottom plate and/or cover plate. This facilitates in an advantageous way firm joining of the cover plate and bottom plate.

Possible plastics are for example COC (cyclo-olefin copolymer), COP (cyclo-olefin polymer), PE (polyethylene), PS (polystyrene), PC (polycarbonate) or PMMA (polymethyl metacrylate).

The base area of the sample chamber can have the dimensions of a conventional microscopy specimen slide, in particular a width of 25.5 mm and a length of 75.5 mm or of a multititre plate. The sample chamber reservoir formed by a recess in the cover plate can have a volume between 10 and 200 μl, preferably between 20 and 150 μl; the height can be between 5 μm and 1 mm, preferably between 0.1 mm and 0.5 mm, the width between 10 μm and 40 mm, preferably between 1 and 10 mm. The height of the sample chamber in a planar region of the cover plate can be between 0.5 and 5 mm, preferably between 1 and 2 mm, in particular 1.7 mm. If the cover plate of the sample chamber has a prominence, in which a recess is formed, then the volume of a reservoir formed in this way can be between 50 μl and 3 ml, preferably between 80 μl and 2.5 ml; the height of a prominence starting from a planar region can be between 1 mm and 1.5 cm, preferably between 5 mm and 1 cm.

Furthermore, through the invention a method of manufacturing a sample chamber is made available with the steps:

Provision of a cover plate and a bottom plate, wherein a recess is provided in the cover plate to form a reservoir with the bottom plate and wherein the surface of the cover plate opposite the recess has a planar region and a prominence;

Treatment of a region of the surface of the cover plate and/or bottom plate to obtain an adhesive layer;

Pressing the cover plate and bottom plate together in order to join them by means of the adhesive layer, wherein the planar region and the prominence are at least partially subjected to pressure in separate steps.

Due to pressing in two separate steps, on one hand the planar region and on the other hand the prominence, these different regions can be very precisely and uniformly subjected to a suitable pressure. Thus, deformation of or damage to the material can be prevented.

The aforementioned method can in particular be used for the manufacture of the previously described sample chambers.

The application of pressure to the planar region can take place by means of a pressing element (or a press die) which has recesses at points corresponding to the prominences. The press element can be formed such that the planar region of the cover plate is subjected to pressure over the complete area. Alternatively or additionally, recesses can also be provided in the regions of the press element, which correspond to the regions of the cover plate at which recesses are provided. Thus, damage in these regions due to the application of pressure can be avoided.

For applying pressure to the prominences a second press element can be provided which has a shape complementary to the prominences of the cover plate. Alternatively, this press element can have a planar surface; also in this way only the prominences can be subjected to pressure.

The separate steps of the pressure application can be carried out in any order.

The treatment of a region of the surface to obtain an adhesive layer can comprise an application of an adhesive, application of a solvent for solubilising the surface, UV treatment, radioactive treatment or laser treatment. In particular the treatment of a region of the surface can comprise heating the surface of the cover plate and/or bottom plate above the material melting point. Preferably this heating can take place in strips along the edge of the bottom plate and/or cover plate.

Through strip-shaped thermal welding of this nature the edge of the sample chamber is sealed for many penetrating agents (such as occur for example with the use of oil immersions for microscopy). Since no large-area heating occurs, deformation in the cover plate and/or bottom plate can be avoided.

Furthermore, the invention makes a method available for surface treatment, in particular for the hydrophilisation of a reservoir surface in a sample chamber, wherein the sample chamber has a cover plate and a bottom plate joined thereto in a fixed manner, wherein a recess with a base is provided in the cover plate so that a cavity reservoir is formed by the bottom plate, with the step:

Plasma treatment of the reservoir surface, wherein the plasma is passed through the cavity reservoir.

Surprisingly, it is found that it is possible to pass a plasma into microstructures of this nature in order to hydrophilise the surface there.

Preferably the plasma treatment can occur with an atmospheric plasma. An atmospheric plasma is taken to mean a plasma which is not ignited in negative pressure in relation to the atmospheric pressure. In particular this may involve a corona treatment with ambient air as the active gas or an atmospheric plasma with nitrogen as the active gas. It has been found that with the use of nitrogen the surface functionalisation such as for example hydrophilisation is more pronounced and lasts longer.

In order to pass the plasma through the cavity structures an overpressure of the plasma gas is advantageous. Here, values between 1 bar and 8 bar are particularly well suited.

When the plasma is passed through the cavity, normally illumination is clearly visible therein.

The plasma treatment can comprise cooling of the plasma and/or of the sample chamber. Due to this cooling, melting or burning of the material of the sample chamber can be avoided.

After generation, the plasma is preferably led for example through a metal pipe to a feed/outlet of the reservoir where it can be passed into the reservoir of the sample chamber.

It has also been found that a surface treatment such as hydrophilisation of the surfaces through the use of waste gases from a plasma can be realised. In this case the plasma treatment can take place in that a plasma waste gas is passed through the cavity reservoir. To achieve this, a nitrogen plasma, for example, can be ignited and then the therein ionised/activated gas passed through a pipe (e.g. 10 cm to 1 m). If this gas is passed directly from the (cold) end of the pipe into a cavity, the inner sides of the cavity are also hydrophilised. Typically, then no illumination of the plasma is visible in the cavity.

The previously described methods for the surface treatment, such as for example for hydrophilisation, can be used in particular for one of the previously described sample chambers.

The invention also makes a method available for the immobilisation of a substance with a concentration gradient on a surface, with the steps:

Provision of a sample chamber with a reservoir, in particular one of the previously described sample chambers;

Treatment of a reservoir surface to facilitate immobilisation of the substance;

Filling the reservoir with a first fluid;

Partial filling of the reservoir with a second fluid, which contains the substance to be immobilised, so that a boundary area is formed in the reservoir between the first and the second fluids;

Flushing of the reservoir with a third fluid after a predetermined time period.

Directly after the filling of the reservoir with the second fluid the reservoir surface on one side of the boundary area has a substance concentration of essentially zero. During waiting for a predetermined time period a diffusion of the substance occurs, so that the substance immobilised on the reservoir surface after the predetermined time period has a concentration gradient, which is retained after flushing with the third fluid due to the immobilisation. In this way a defined surface concentration gradient can be produced.

Even if directly after filling with the second fluid the surface concentration is not essentially zero, then for example a parabolic decay is present. After an appropriately long waiting period the two fluids are mixed, wherein the diffusion time or the diffusion constant may depend on parameters such as the substance size, temperature, viscosity, etc. Preferably liquids are used as the fluids. Alternatively however, gases can also be used, wherein then predetermined pressure relationships are established in the reservoir.

The treatment of a reservoir surface in order to facilitate immobilisation of the substance can comprise a wet-chemical treatment. Examples of a wet-chemical treatment of this nature are described, for example, in S. Löfas and Bo Hohnson in J. Chem. Soc.; Chem. Commun. 1990; 1526-1528. The wet-chemical treatment can precede a plasma treatment, as previously described.

Streptavidin or biotin, for example, can be used as the substance to be immobilised.

BRIEF DESCRIPTION OF THE DRAWINGS

Further features are explained based on the examples of embodiments given in the figures. The following are illustrated.

DETAILED DESCRIPTION OF THE INVENTION

Figure 1:
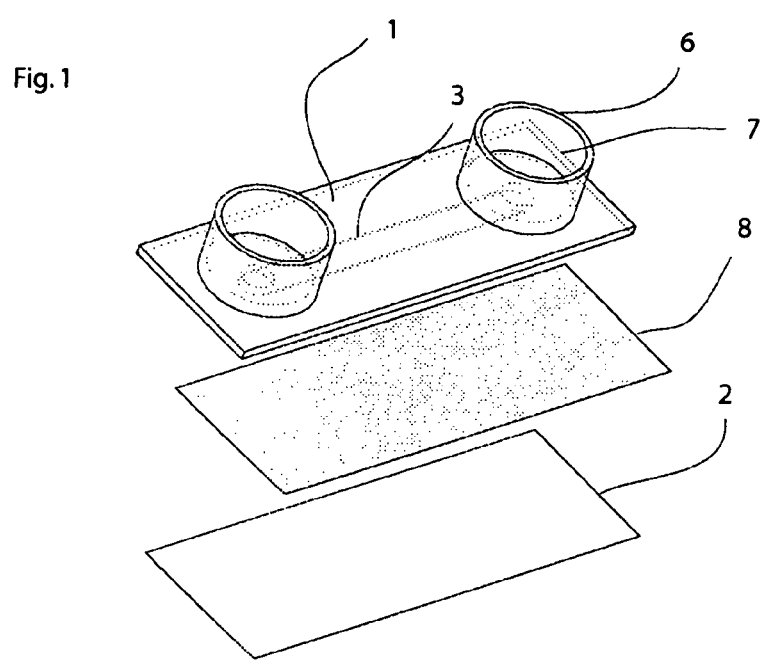
FIG. 1 an exploded view of a sample chamber with a planar element in a reservoir.
Figure 2:
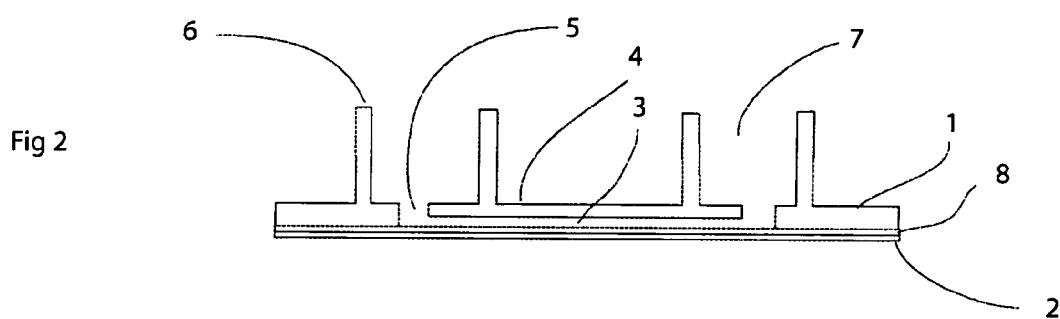
FIG. 2 a cross-sectional view of the sample chamber from FIG. 1.

FIG. 1 illustrates an exploded view of an embodiment of a sample chamber according to the invention. The sample chamber comprises a cover plate 1 and a bottom plate 2. An elongated recess 3 is provided in the cover plate 1. As can be seen in particular in FIG. 2, the recess 3 has a base 4, so that through the bottom plate 2 a reservoir in the shape of a cavity is formed in the cover plate and thus in the sample chamber.

At each of the ends of the elongated recess a through hole 5 is formed in the cover plate. These channels act as a feed or outlet for the reservoir formed by the recess 3. In this way a flow chamber is formed.

The surface of the cover plate situated opposite the recess 3 is formed planar over a large region. However, it has two prominences 6 in each of which a recess 7 is formed. In this way two further reservoirs are made available, which are joined for fluid flow via a through hole 5 to the reservoir formed by the recess 3.

A planar element 8 is clamped between the cover plate 1 and the bottom plate 2. In the reservoir formed by the recess 3 this planar element 8 directly contacts the bottom plate 2.

The planar element with holes can, for example, be an electron microscope grid of gold or copper coated with carbon, a film with predetermined holes or a fabric with predetermined aperture size, yarn diameter and thickness. The optical properties of the planar element can be chosen to suit the desired use. For example, for transmitted light microscopy very high contrasting meshes, i.e. with a dark colour, can be used. Correspondingly, with fluorescence microscopy planar elements with high or low intrinsic fluorescence can be used.

The planar element can be used both for the localisation and fixing of objects. If, for example, a mesh with a thickness of 500 μm and an aperture size of 100 μm is used and if this mesh is arranged directly on the bottom plate, then with laminar flow over this structure, objects with a diameter smaller than 500 μm remain in the holes. For this application the distance between the planar element and the bottom plate can, for example, be between 0 and 100 µm. However, as short a distance as possible is preferred so that neither particles nor liquid can flow between the bottom plate and the planar element. In this way the holes in the planar element act as micro-reservoirs.

The bottom plate can be a film with a thickness of 150-200 µm. Depending on the desired use, the bottom plate can have a refractive index of 1.5, a minimum intrinsic fluorescence and/or a minimum double refraction. Suitable materials are for example films of COC.

In principle the cover plate 1, planar element 8 and bottom plate 2 can be detachably joined together; this can for example be achieved through a clamping mechanism.

In this embodiment however the bottom plate 2, planar element 8 and cover plate 1 are joined together in a fixed manner. For this, for example, a region of the bottom plate facing the cover plate is provided with an adhesive layer. Alternatively or additionally this can also occur with a region of the cover plate facing the bottom plate.

For example an adhesive can be applied to the bottom plate. Alternatively, the bottom plate can be brought into contact with a suitable solvent such as methanol or toluol, or solvent vapour, so that the surface is solubilised and an adhesive layer is formed in this way. Then the bottom plate 2 and the cover plate 1 are pressed together with the planar element 8 arranged between them in order to establish a firm joint. The adhesive layer (due to the use of a sufficient quantity of adhesive or solvent) is preferably formed such that joining of the cover plate 1 and bottom plate 2 is produced through the holes in the planar element.

Also other joining methods are suitable for manufacturing a sample chamber according to the invention.

With the use of adhesive or solvent the joint can optionally provide access for a penetrating agent. If materials such as PC, PMMA, COC or COP are used for the sample chamber, with the use of oil immersions for microscopy applications, oils can penetrate the plastic between the bottom plate and the cover plate and lead to stress cracks.

Ingress of penetrating agents of this nature can, for example, be prevented by the thermal welding of the bottom plate and the cover plate. To do this, the bottom plate and/or the cover plate are heated above the respective melting temperature along their edge in a strip pattern; then the bottom plate and the cover plate are pressed together. If part of the planar element 8 is also located between the bottom plate and the cover plate in the heated region, it has either similarly started to melt or it is pressed into the melted surface of the cover plate and/or bottom plate. Due to sealing of the sides in this manner by means of thermal welding, the ingress of most penetrating agents is prevented. Due to the strip-shaped heating, in contrast to large-area heating of the whole bottom plate and/or cover plate, deformations in the bottom plate or cover plate are prevented.

Independent of the type of adhesive layer, it is desirable to press the bottom plate and cover plate together evenly; a uniform pressure should be exerted on all regions of the sample chamber. In particular with sample chambers with non-planer surfaces, as illustrated in the figures, the use of suitably formed press dies is advantageous. The press dies used can, for example, be of aluminium. The press die can advantageously have a shape complementary to the cover plate. If the cover plate is, for example, manufactured by an injection moulding method, the press die can comprise the master of the corresponding injection moulded part.

Due to production tolerances during manufacture the press element can comprise a material with a Shore hardness A of between 60 and 90. Thus the press die can adapt to the cover plate evenly during the press process, ensuring an optimum pressure distribution. Press dies can be used which do not precisely fit to the cover plate, but rather have a certain amount of play (for example 500 µm).

According to an alternative method, the pressing together of the base plate and the bottom plate occurs in two steps. A different press die is used for each of the two steps. In a first step only planar regions of the cover plate are subjected to pressure. For this, the first press die has recesses on the places corresponding to the prominences of the cover plate so that they are not subjected to pressure. The second press die is formed such that therewith only the non-planar regions, in particular the prominences, of the cover plate are subjected to pressure. To achieve this, the second press die can have at least partially a complementary shape to the prominences of the cover plate. Alternatively, the second press die can also be formed planar and in particular have no recesses on the places corresponding to the prominences; thus then only the prominences of the cover plate are subjected to pressure. With this dual-step method the use of a soft material is possible, but not necessary. Furthermore, the two pressing steps can be carried out in a different order.

If the bottom plate and the cover plate are joined using a solvent, it is advantageous if the planar element comprises a material which cannot be dissolved by this solvent. However, the planar element can comprise a material which can be dissolved by a different solvent. In this case the bottom plate and the cover plate can be joined using the first solvent. If the whole of the side of the bottom plate facing the cover plate is treated with the first solvent and the planar element is located directly on the bottom plate, the planar element is pressed into the bottom plate during pressing. Once the adhesive layer has hardened, a solvent can be introduced into the reservoir through which the planar element is dissolved, but the bottom plate and the cover plate are not attacked. The remaining impression can be used as a localisation grid.

The micro-reservoirs formed in the holes in the planar element can be used with various analysis methods. For example, in the micro-reservoirs suspension cultures can be held which are then not flushed away when the medium in the reservoir is exchanged. Since only very low flow velocities prevail in the micro-reservoirs also with flow through the reservoir, non-adherent cells or molecules also remain in the holes. Furthermore, a fast interchange of solvent in the reservoir is possible, because the diffusion barrier is within a range of at the most several 100 µm.

Furthermore, with sample chambers of this nature chemotactic examinations can be undertaken. If a concentration gradient of a substance is formed in the liquid in the reservoir, the migration, for example, of cells previously evenly distributed in the holes of the planar element can be observed in a direction within the micro-reservoirs. Then the distribution of chemotactically sensitive cells in the various micro-reservoirs can be statistically examined to draw conclusions about the cell mobility. With the application of a regular arrangement of holes, for example with the use of a mesh, algorithms for the analysis of the distributions in mesh structures can be used based on the Fourier transformation.

Through a suitable choice of the arrangement of holes in the planar element, cells can be grown in a certain morphology. For example, meshes with an aperture size can be used which are in the order of magnitude of the cells or are smaller. The aperture size can, for example, be 2 µm to 100 µm. Cells can grow in a three-dimensional structure in the larger meshes.

In the reservoir formed by the recess 3 the surface of the cover plate 1 and the bottom plate 3 can be surface treated with a corona treatment, in particular hydrophilised. Particularly suitable materials for the bottom and cover plate are in this case COC, COP or PS. The plasma is produced under overpressure or atmospheric pressure. For this purpose normal ambient air can be used. Better results can be achieved however through the use of nitrogen as active gas. After its production the plasma can be passed through a through hole 5 into the reservoir formed by the recess 3. The corresponding plasma activation is then indicated, for example, by illumination of the plasma in the reservoir.

Melting or burning of the material of the bottom plate, cover plate and planar element can be prevented by cooling the plasma gas and/or sample chamber. Furthermore, through cooling, deformation of the elements of the sample chamber can be prevented. A further advantage of a plasma treatment of this nature is that the optical properties of plastics such as COC, COP, PS, PC or PMMA are only slightly changed. A plasma treatment of this nature is not bound to the previously described, special embodiments of the sample chamber.

If with one of the described sample chambers a plasma treatment is carried out, preferably a planar element is used which is not or only slightly hydrophilised by the plasma treatment. In this way aqueous drops can be particularly well held in the holes of the planar element.

Furthermore, in the described sample chambers surface concentration gradients can be produced on immobilised substances in the reservoirs. As already described above, for this, a non-reactive liquid can be charged into the reservoir after activation of a reservoir surface. Thereafter another liquid is charged to a certain point of the reservoir with the substances to be immobilised so that a boundary region is formed between the liquids with and without substances to be immobilised. Initially this boundary region can have a parabolic concentration profile. After a suitable waiting period the liquids are mixed and the substance with a defined surface concentration gradient is immobilised. Then the reservoir can be flushed.

Depending on the material of the sample chamber or plasma and apart from the substances to be immobilised, the liquids used can contain other substances, for example, for passivation or activation. Furthermore, catalysts can be made available for establishing the reaction genetics. The substance to be immobilised can be introduced as part of a larger complex, for example a molecule, and then split up on the surface. In addition the immobilisation of different substances in several, consecutive steps can be carried out.

Figure 3:
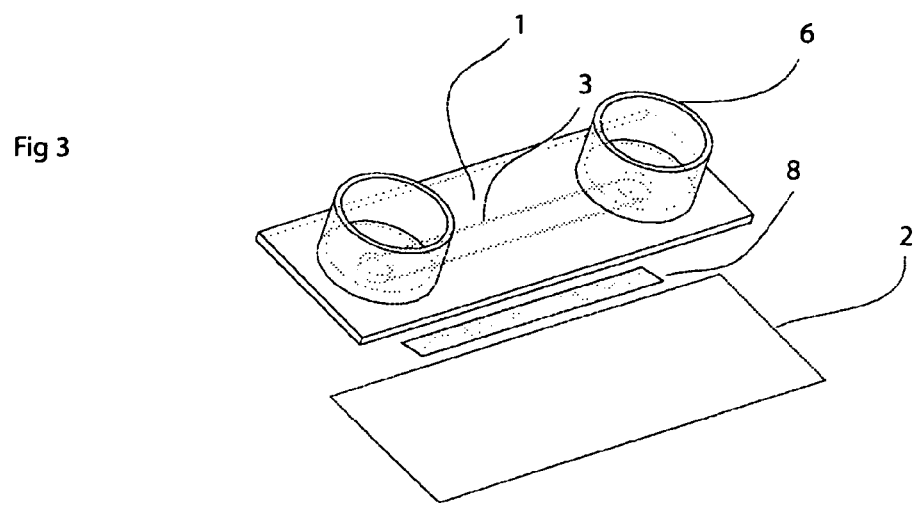
FIG. 3 an exploded view of a sample chamber with a planar element of a smaller size.

FIG. 3 illustrates a further embodiment of a sample chamber with a planar element. In contrast to the embodiment of FIG. 1, in FIG. 3 the area of the planar element no longer corresponds to the area of the bottom plate. Instead the area of the element 8 corresponds to the size of the recess 3. In this case the element 8 is not clamped by the bottom plate 2 and the cover plate 1. The planar element 8 can for example be fixed with an adhesive to the bottom plate 2 or to the cover plate 1 (in particular to the base of the recess). Alternatively, the planar element can be solubilised with a solvent and in this way joined to the bottom plate or to the cover plate. According to a further alternative, the planar element can be arranged in the reservoir without a fixed connection.

The dimensions of the planar element 8 can also be chosen somewhat larger or somewhat smaller than the dimensioning of the recess. In the first case clamping between the bottom plate and the cover plate is possible. For this, the planar element 8 can have edge lengths which are 5 to 500 µm larger than the corresponding dimensions of recess 3.

Figure 4:
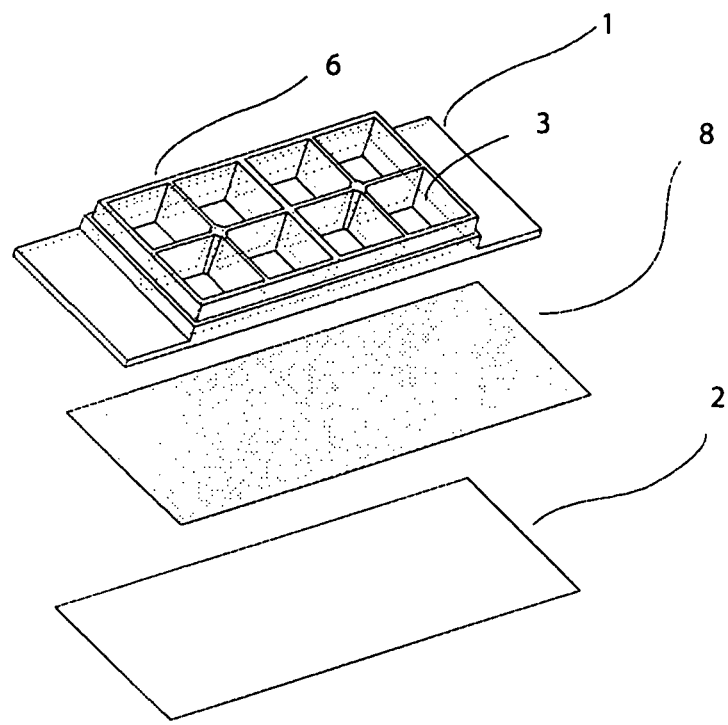
FIG. 4 an exploded view of a sample chamber with several reservoirs open at the top, for which a planar element is provided.

FIG. 4 shows a further embodiment of a sample chamber according to the present invention. Here, eight recesses 3 are provided in the cover plate 1. These recesses have no base and are formed as a hole in the cover plate. Due to the corresponding prominences 6 eight reservoirs 3 are formed which are completely open at the top or the outside. According to the embodiment of FIG. 1, a planar element 8 is also provided here, the dimensions of which correspond to the dimensions of the bottom plate.

With these open reservoirs the bottom plate can be spotted with certain molecules from above through the holes of the planar element. The spot morphology is improved by the arrangement of the holes. In particular an even distribution of the molecules to be spotted is possible. Through the use of different spots, tests can be conducted to find out which molecule or molecule-cell interactions take place.

Figure 5:
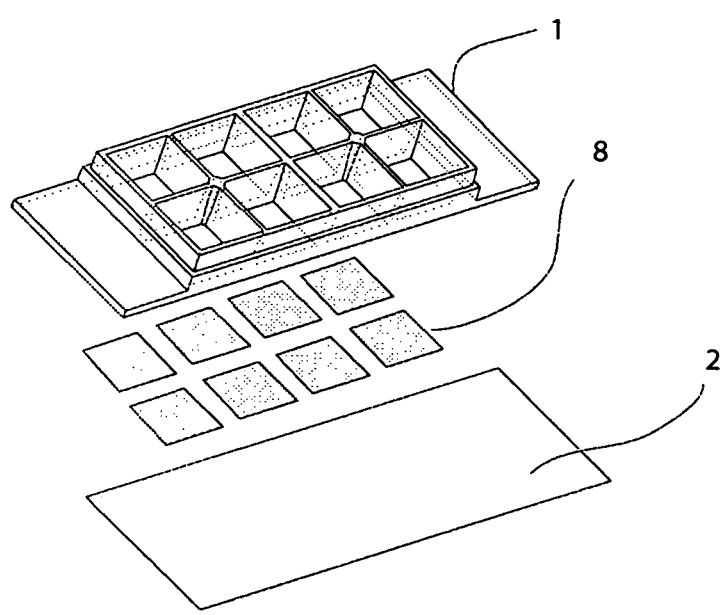
FIG. 5 an exploded view of a sample chamber with several reservoirs open at the top, in each of which a planar element is provided.

In FIG. 5 a sample chamber is illustrated, the bottom plate 2 and cover plate 1 of which correspond to those of FIG. 4. In this embodiment however a planar element 8 is provided for each reservoir. Analogous to the embodiment illustrated in FIG. 3, the dimensions of a planar element here can also be smaller or larger than the dimensions of the corresponding reservoir base area or have an equal size. If the planar element is not clamped between the bottom plate and cover plate, it can either be joined to the bottom plate in a fixed manner or placed on loosely.

The invention claimed is:

1. Method of manufacturing a sample chamber with a cover plate and a bottom plate joined thereto in a fixed manner, the cover plate being provided with a recess, so that a reservoir is formed by the bottom plate, a planar element with openings having at least one of a predetermined arrangement and size provided in the reservoir, the method comprising:
   provision of a cover plate and a bottom plate, wherein a recess is provided in the cover plate to form a reservoir with the bottom plate and wherein the surface of the cover plate opposite the recess has a planar region and a prominence;
   treatment of a region of the surface of at least one of the cover plate and the bottom plate to obtain an adhesion layer; and
   pressing the cover plate and bottom plate together in order to join them by means of the adhesive layer, wherein the planar region and the prominence are at least partially subjected to pressure in separate steps.

2. Method according to claim 1, wherein the planar element comprises a fabric.

3. Method according to claim 2, wherein the fabric is a mesh or a film.

4. Method according to claim 1, wherein the planar element is arranged parallel to the bottom plate.

5. Method according to claim 1, wherein the planar element is clamped between the bottom plate and the cover plate.

6. Method according to claim 1, wherein at least one of the openings in the planar element has a diameter of 2-500 µm, the planar element has a thickness of 3-500 µm, and the planar element has a distance to the bottom plate of 0-100 µm.

7. Method according to claim 6, wherein the holes openings in the planar element have diameters of 10-200 µm.

8. Method according to claim 6, wherein the planar element has a thickness of 40-300 µm.

9. Method according to claim 6, wherein the planar element has a distance to the bottom plate of 0-10 µm.

10. Method according to claim 1, wherein the planar element has at least one of a predetermined colour, a predetermined intrinsic fluorescence lower or equal to the intrinsic fluorescence of COC or COP, and a predetermined refractive index higher than 1.2 and lower than 1.7.

11. Method according to claim 1, wherein the planar element comprises at least partially a material which is soluble in solvent.

12. Method according to claim 1, wherein the recess in the cover plate has a base so that a cavity is formed by the bottom plate.

13. Method according to claim 1, wherein at least one of the cover plate and the bottom plate has a channel opening into the reservoir from outside.

14. Method according to claim 13, wherein the channel is a through hole.

15. Method according to claim 1, wherein the bottom plate has a thickness of 50-250 μm.

16. Method according to claim 15, wherein the bottom plate has a thickness of 100-200 μm.

17. Method according to claim 1, wherein at least one of the cover plate, the bottom plate and the planar element comprise a plastic.

18. Method according to claim 17, wherein the plastic is at least one of without double refraction and intrinsic fluorescence.

19. Method according to claim 1, wherein at least one of the bottom plate, the cover plate and the planar element are joined using adhesive, solvent, UV treatment, radioactive treatment, laser treatment or thermal welding.

20. Method according to claim 1, wherein the treatment comprises a strip-shaped heating of at least one of the bottom plate and cover plate above the material melting point along their edges.

21. Method of surface treatment for the hydrophilisation of a reservoir surface in a sample chamber according to claim 1, wherein the sample chamber comprises a cover plate and a bottom plate joined thereto in a fixed manner, wherein a recess with a base is provided in the cover plate so that a cavity reservoir is formed by the bottom plate, the method comprising:
    plasma treatment of the reservoir surface, wherein the plasma a waste gas of the plasma is passed through the cavity reservoir.

22. Method according to claim 21, wherein an atmospheric plasma, is used for the plasma treatment.

23. Method according to claim 22, wherein the atmospheric plasma includes nitrogen as the active gas.

24. Method according to claim 21, wherein the plasma treatment comprises cooling of at least one of the plasma and the sample chamber.

* * * * *